United States Patent
Koerner et al.

(10) Patent No.: US 6,939,266 B2
(45) Date of Patent: Sep. 6, 2005

(54) SHIFT INTERRUPT SYSTEM

(75) Inventors: Scott A. Koerner, Kenosha, WI (US); Thomas A. Busse, Briston, WI (US); Douglas M. Goebel, Big Bend, WI (US)

(73) Assignee: Bombardier Recreational Products Inc, Valcourt (CA)

( * ) Notice: Subject to any disclaimer, the term of this patent is extended or adjusted under 35 U.S.C. 154(b) by 0 days.

(21) Appl. No.: 10/349,595

(22) Filed: Jan. 22, 2003

(65) Prior Publication Data
US 2003/0148851 A1 Aug. 7, 2003

Related U.S. Application Data
(60) Provisional application No. 60/319,090, filed on Jan. 22, 2002.

(51) Int. Cl.$^7$ .................. B60K 41/04; B60K 41/00; F02P 9/00; F02D 7/00
(52) U.S. Cl. .................. 477/109; 123/334; 123/481; 440/86
(58) Field of Search .................. 477/107, 109, 477/113; 440/75, 84, 86, 87; 123/332, 333, 334, 335, 481, 189 F

(56) References Cited

U.S. PATENT DOCUMENTS

| 4,838,822 | A | * | 6/1989 | Friedle et al. ............. 440/86 |
|---|---|---|---|---|
| 5,540,633 | A | * | 7/1996 | Yamanaka et al. .......... 477/107 |
| 5,974,354 | A | * | 10/1999 | Janecke et al. ............. 74/335 |
| 6,217,480 | B1 | * | 4/2001 | Iwata et al. ................ 477/107 |
| 6,364,726 | B1 | * | 4/2002 | Motose et al. ............. 477/113 |
| 6,416,367 | B1 | * | 7/2002 | Goebel ....................... 440/75 |
| 6,619,152 | B2 | * | 9/2003 | Ochi et al. .................. 74/335 |
| 2002/0065169 | A1 | * | 5/2002 | Suzuki et al. .............. 477/109 |

FOREIGN PATENT DOCUMENTS

| JP | 403229060 A | * | 10/1991 | ............. 477/109 |
|---|---|---|---|---|
| JP | 405099305 A | * | 4/1993 | ............. 477/109 |
| JP | 406227289 A | * | 8/1994 | ............. 477/109 |

* cited by examiner

Primary Examiner—Roger Pang
(74) Attorney, Agent, or Firm—BRP Legal Services

(57) ABSTRACT

A shift enabling interrupt system that facilitates the shifting of gears of an outboard engine is disclosed. The system is activated by the signal from a sensor that determines if the user is attempting to shift the gears by detecting a lost motion in a shift linkage manually activated by the user to shift the gear train of the engine. Upon such activation, the system ECU carries out a set of steps that periodically reduce the speed of the engine by disabling one or more cylinders to facilitate the gear shift. After a predetermined number of revolutions, the disabled cylinders are again enabled to return the engine speed back to normal operation. A timer establishes a maximum elapsed time to complete the shifting operation and the gear shifting itself is only permitted if the RPM of the engine is less that a predetermined value.

13 Claims, 5 Drawing Sheets

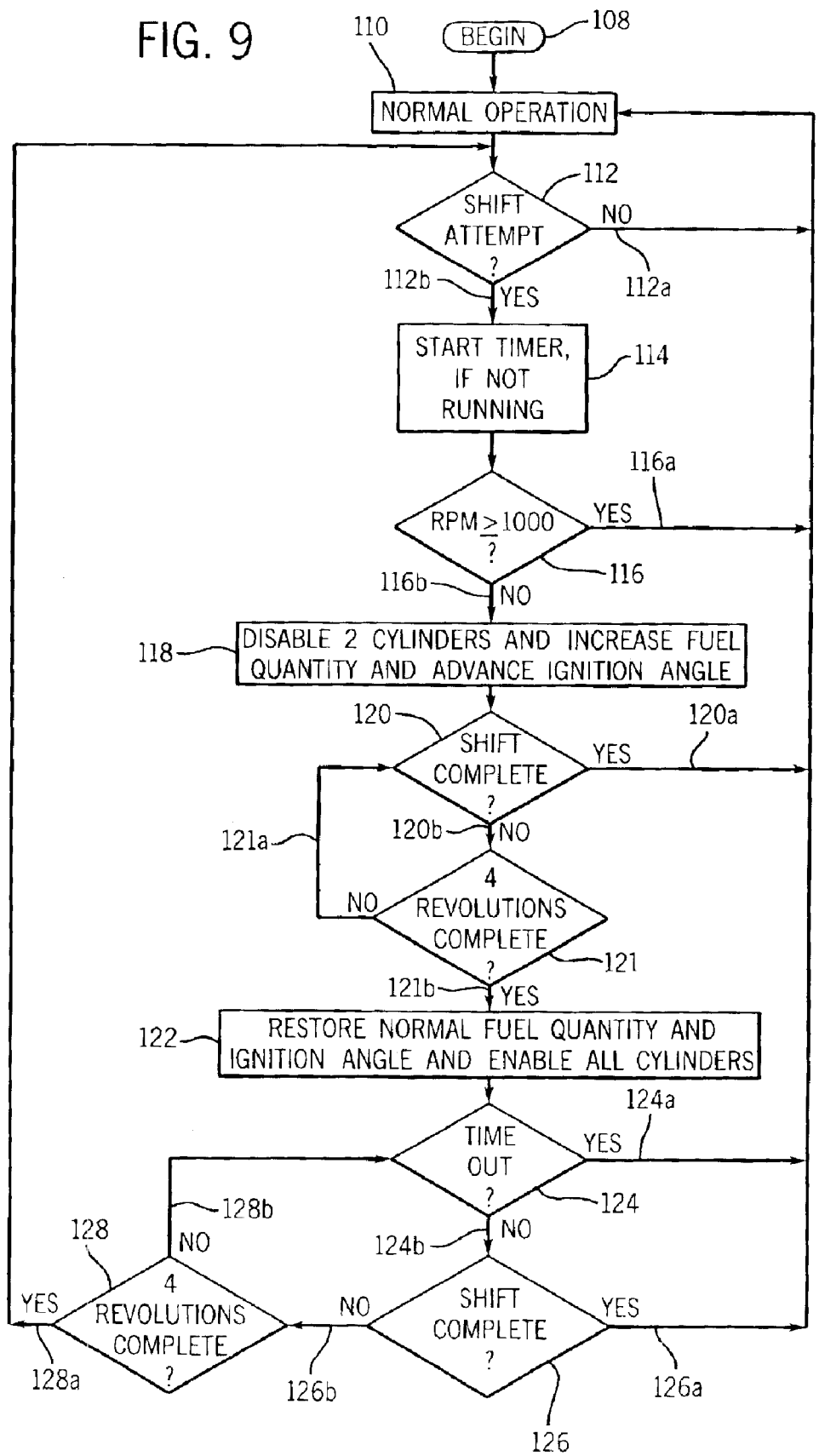

SHIFT INTERRUPT SYSTEM

CROSS REFERENCE TO RELATED APPLICATION

The present application claims benefit of U.S. Ser. No. 60/319,090 filed Jan. 22, 2002.

BACKGROUND OF THE INVENTION

The present invention relates generally to a shifting system for an outboard motor, and more particularly, to a shift interrupt system that facilitates the shifting of gears during the operation of the outboard motor.

Manual shift vehicles typically employ a clutch to facilitate shifting for engagement and disengagement of the gears in a standard shift transmission. However, in certain types of engine applications, such as marine outboard engines, there is no clutch system and gear shifting can occasionally demand more effort from an operator to shift from a positive gear position to a neutral position.

A typical outboard marine engine has three gearshift positions to provide operation, namely, forward, neutral, and reverse. Thus, the shifting of the gears from neutral to either the forward or reverse positions is accomplished by forcing the gears to mesh together while, on the other hand, the shifting from either forward or reverse gears into the neutral position is accomplished by forcing the gears to separate. In either instance, a mechanical linkage is used to carry out the forcing of the gears in one direction or the other.

While the shifting of the gears from a neutral positions into either the forward or reverse positions is normally fairly easy, it is sometimes very difficult to carry out the shifting of the gear from forward or reverse into neutral as a result of the loading that is on the gears due to the speed of the engine propelling the gears. Historically, there have been shift enabling interrupt systems that have been used to assist in the shifting from an in-gear position into a neutral position. In general, these known systems attempt to relieve the amount of force imposed upon the gears. When that force is excessive, one or more of the cylinders on the engine are caused to misfire. The resulting misfires consequently causes an uneven torque output which causes the load on the gears to drop to a lower amount momentarily. Thus, when the load on the gears is reduced, the mechanical linkage is allowed to cause the gears to move, and the engine is no longer forced to misfire.

One drawback, however, of the aforementioned system is that when the engine is caused to misfire, the engine speed is thereby reduced and is erratic. In situations where multiple, rapid shifts are initiated, such as in docking maneuvers, the reduction in the engine speed can be so severe that the engine can stall and require restart.

It is therefore desirable to design a shift enabling interrupt system for use with an outboard marine engine that allows for shifting of gears under increased engine load without engine misfire.

BRIEF DESCRIPTION OF THE INVENTION

The present invention relates to a method and system to facilitate the gear shifting operation of an outboard engine that overcomes the aforementioned problems.

The present invention provides a method and system by which the shifting of gears can be carried out through the automatic and periodic reduction in the speed of the outboard engine and the rapid-fire reestablishment of the engine back to its normal speed. The system is activated by an attempt by the user to shift the gears.

In the present invention, therefore, there is a normal gear shifting mechanism that is manually operated by the user to carry out the shifting function and a transmission that carries out the shifting function. A shift linkage is interposed intermediate the gear shift mechanism and the transmission and which transmits the user activated motion to the gear transmission where the action of the user is interpreted and results in the correct shifting of the transmission.

Thus, there is a sensor that senses the movement initiated by the user and that sensor is located so as to detect the motion of the shift linkage. In the preferred embodiment, that sensor is a part of a lost motion mechanism incorporated into the shift linkage that senses the initial movement of the linkage and activates the sensor to provide a signal indicative of that initial movement. After the initial lost movement to activate that sensor, the shift linkage thereupon transmits the motion of the shift mechanism positively to the transmission to effect the gear change.

Accordingly, the aforementioned sensor is preferably an electrical switch and which provides an electrical signal to the electronic control unit or ECU of the engine. The ECU includes a microprocessor that basically carries out the present invention by a series of functional steps based upon data received from the sensor as well as other inputs to the ECU, including a signal indicative of the rpm of the engine.

A system is provided to sense when a user is attempting to carry out a shifting of the gears of the engine whereupon the system causes the torque output of the engine to fluctuate to facilitate that shifting operation to relieve the pressure on the gears. That fluctuation in the engine output torque is carried out by disabling at least one of the engine cylinders, preferably two of such cylinders in a six cylinder engine, so that the engine rpm is reduced. The system will cause the cylinders not disabled to output additional torque to minimize reduction in engine speed while causing maximum variation in output torque. The system determines when a certain number of revolutions of the engine have occurred at the reduced speed and, after that number of revolutions has occurred, the system automatically returns the engine speed back to the normal speed by again enabling the cylinder or cylinders that were disabled.

The system also includes a timer that is activated by the sensor indicating the initiation of an attempt to shift the gears, and the timer sets a maximum amount of time for the shifting of the gears to take place. That is, after all of the cylinders have been enabled again, the timer determines if that maximum amount of time has elapsed since the initiation of the shift function and, if that time has so elapsed, the system returns the engine operation back to its normal operation. If, on the other hand, the timing function determines that the cylinders have all been enabled for a number of revolutions and the maximum time has not elapsed, the system will then ascertain whether the shift operation has been completed. If the shift operation has been completed, the engine operation will again be restored to its normal operation. However, if the engine shift has not been completed, the present system will then return the system to the beginning of the cylinder interrupt cycle and carry out the steps again of disabling the at least one cylinder and carrying out the same steps as described.

The system monitors the rpm of the engine and, if the rpm is determined to be in excess of a predetermined value, the present system will not proceed with the disabling of the at least one cylinder but will simply return the engine to its normal operation even when that initiation of the shift has been detected by the sensor until the rpm is reduced. Thus, the disabling of the at least one cylinder and subsequent steps of the present invention will only be carried out if the rpm of the engine is below a predetermined speed.

Therefore, in accordance with one aspect of the present invention, a shift enabling interrupt system includes a shift linkage communicating with the gear train of an engine. The system further includes a sensor to detect motion of the shift linkage and an ECU having a computer readable storage medium having thereon a computer program that when executed causes the ECU to receive a signal from the sensor indicative of motion in the shift linkage. The computer program further causes the ECU to periodically disable at least one cylinder of the engine and periodically enable all cylinders of the engine.

In accordance with a further aspect of the present invention, a system to enable a gear shift of an engine includes an engine having a microprocessor connectable to a gear shift, wherein the gear shift includes a shift linkage and a shift sensor. A computer program that when executed by a microprocessor causes the microprocessor to periodically disable at least one cylinder of the engine for a predetermined number of engine revolutions, enable all cylinders, and continue to repeat the periodically disablement and enablement acts during a shift attempt.

According to another aspect, the present invention includes a method to promote shifting of a gear shift of an outboard marine engine that includes the step of determining an attempted shift of a gear shift of an outboard marine engine. The method further includes the steps of insuring revolutions per minute of the engine is under a given value and disabling at least one cylinder of the engine for at least one revolution. The method also includes the step of enabling each cylinder of the outboard marine engine upon completion of the at least one revolution. The steps of determining an attempted shift, insuring revolutions per minute, and disabling at least one cylinder are repeated until a process disabling step occurs.

In accordance with yet another aspect of the present invention, a system for enabling shifting of a gear shift of an engine includes means for detecting an attempted shifting of gears of engine and means for monitoring revolutions per minute of the engine. The system also includes means for periodically disabling a number of cylinders of the engine as well as means for periodically re-enabling each cylinder of the engine. A means for repeating each of the aforementioned functions until a disabling function occurs is also provided.

Various other features, objects and advantages of the present invention will be made apparent from the following detailed description and the drawings.

BRIEF DESCRIPTION OF THE DRAWINGS

The drawings illustrate a presently contemplated embodiment for carrying out the invention.

In the drawings:

FIG. 9 is a flow chart showing an implementation of the present invention that may be used with the apparatus of the foregoing Figures.

DETAILED DESCRIPTION OF THE PREFERRED EMBODIMENT

Figure 1:
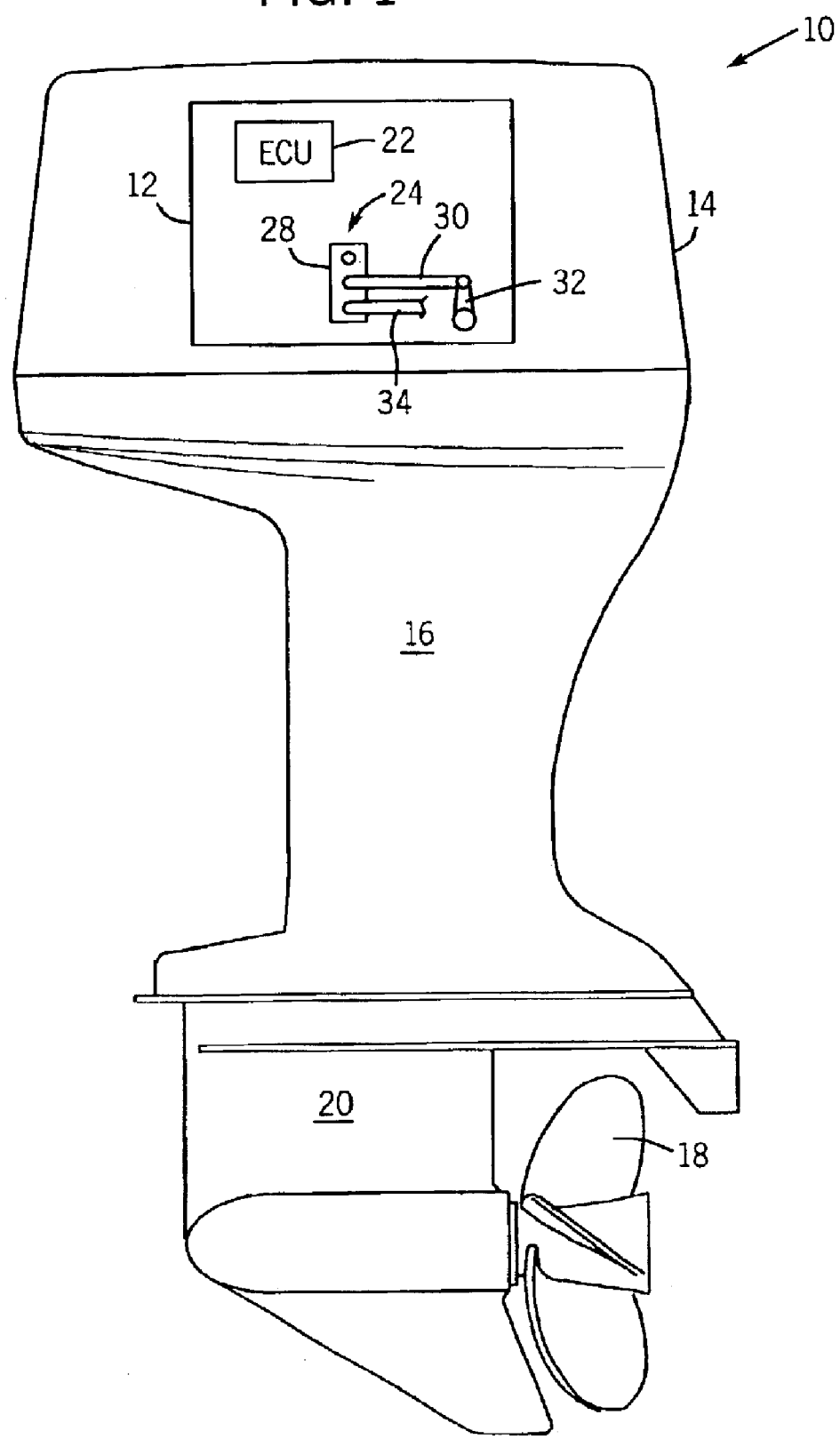
FIG. 1 is a schematic view of an outboard marine engine employing a shift linkage constructed in accordance with one embodiment of the present invention.

Referring to FIG. 1, there is a shown a schematic view of an outboard marine engine 10 that includes an internal combustion engine 12 housed in a power head 14 and supported on a mid-section 16 configured for mounting on a transom of a boat (not shown) in a conventional manner. The output shaft (not shown) of the motor 10 is coupled to a propeller 18 extending rearwardly from a lower gear case 20 attached to the lower end of the midsection 16. The internal combustion engine 12 may be controlled by an electronic control unit (ECU) 22, which, in a preferred embodiment, is an integral computer.

The outboard marine engine 10 includes a shift linkage 24 controlled by a shift cable 34. The shift linkage 24 is mounted on a side of the internal combustion engine 12. A linkage bracket 28 is pivotally affixed with respect to the internal combustion engine 12. The shift cable (hereinafter drive linkage) 34 rotates the linkage bracket, and in turn, drives a driven linkage 30 that has one end affixed to the linkage bracket 28 and the other end affixed to a driven arm 32 that is also pivotally affixed with respect to the internal combustion engine 12. The various pivoting motions of the driven linkage 32, the drive linkage 34 and, of course, the linkage bracket 28 will be later explained.

Figure 2:
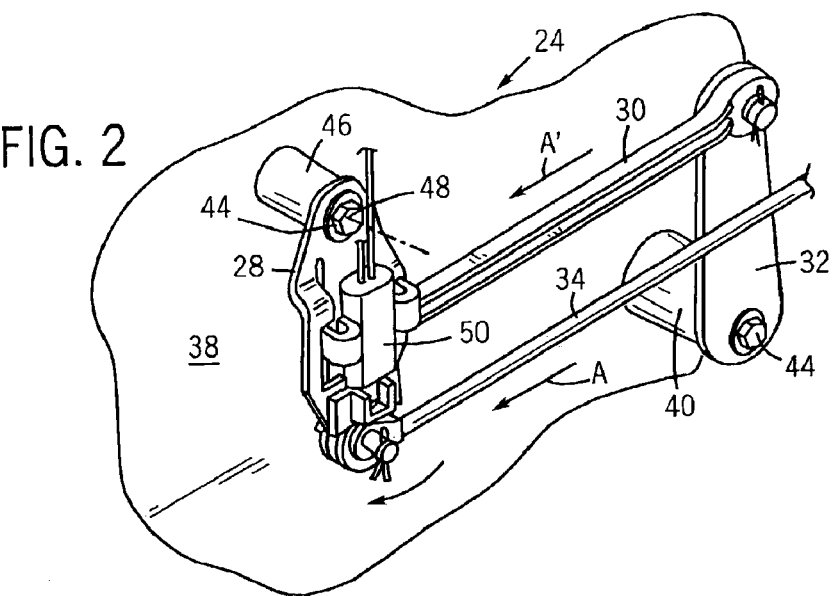
FIG. 2 is an enlarged perspective view of a portion of FIG. 1 that includes the shift linkage constructed in accordance with the present invention.

Turning now to FIG. 2, there is shown, an enlarged perspective view of the shift linkage 24 constructed in accordance with the present invention. In this Figure there can be seen that the driven arm 32 is pivotally affixed to a stationary surface 38 with respect to the internal combustion engine 12. The stationary surface 38 may be a surface of the internal combustion engine 12 itself or a fixed surface that is a part of the engine housing or other component fixed in position. As such, the pivotal mounting of the driven arm 32 may be by means of a driven arm spindle 40, and which is, in turn, pivotally affixed to the stationary surface 38 by means such as a bolt 44 or may be welded.

The linkage bracket 28 is also pivotally affixed to the stationary surface 38 and that affixation can be by a similar means including a linkage bracket spindle 46 that is, in turn, affixed to the stationary surface 38 by means of a bolt 44, thereby creating a pivot point 48 for the linkage bracket 28. The driven linkage 30 is affixed to the linkage bracket 28 at a finite distance or radial length away from the pivot point 48 and the drive linkage 34 is also affixed to the linkage bracket 28 at a further radial length away from that pivot point 48, as will later become clear. It is noted that the movement of the drive linkage 34 in the direction of arrow A, will cause the linkage bracket 28 to rotate in the clockwise direction and further cause the driven linkage 30 to also move generally in the direction of arrow A. This clockwise rotation of the linkage bracket 28 will therefore cause the driven linkage 30 to move in the direction of arrow A, such that the driven arm 32 can cause the shifting of the gear position of the outboard marine engine between the reverse, neutral and forward positions, in a conventional manner. An electrical switch 50 is also mounted on the linkage bracket 28 in a specially constructed manner as will later be described.

Figure 3:
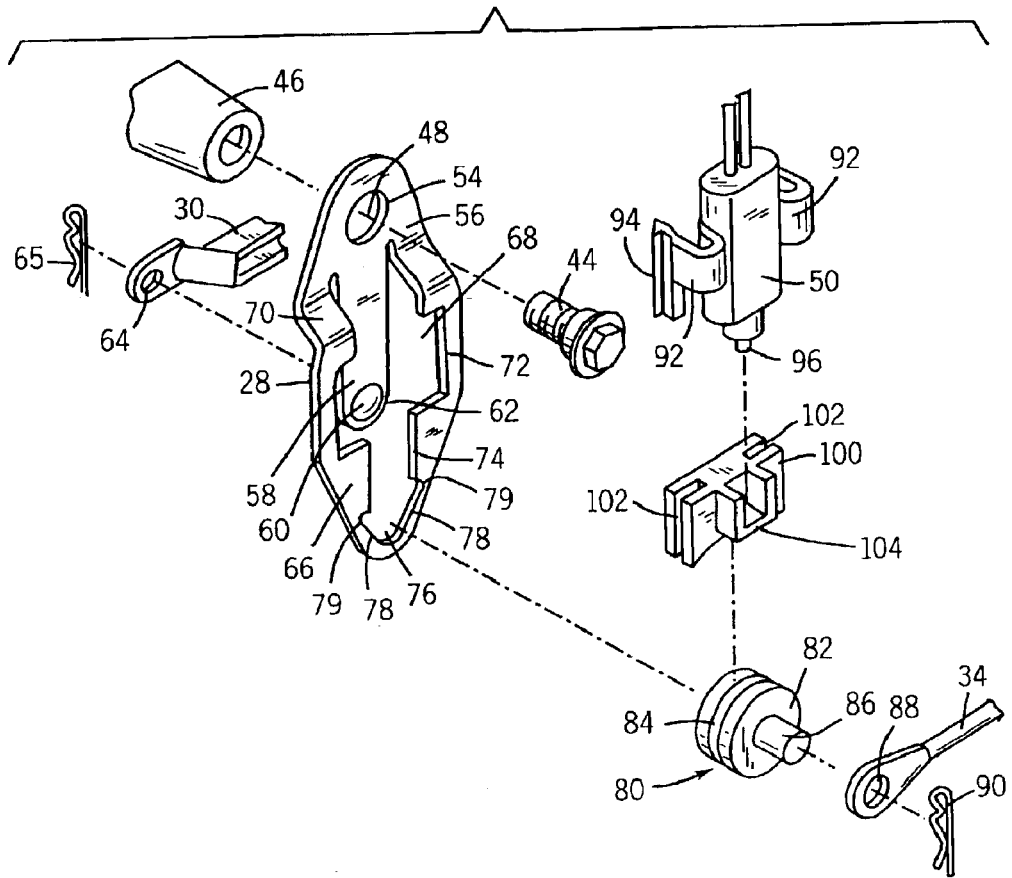
FIG. 3 is an exploded perspective view of a portion of FIG. 2 showing the present invention.

Referring now to FIG. 3, there is shown an exploded perspective view of certain components used in construction of the shift linkage 24 of FIG. 2. In FIG. 3 there can be seen the pivot point 48 about which linkage bracket 28 rotates by means of the affixation with the linkage bracket spindle 46 by bolt 44 passing through an opening 54 formed in the upper portion 56 of the linkage bracket 28. The linkage bracket 28 itself is formed in a special configuration and comprises a downwardly directed tongue 58 from that upper portion 56 and which extends downwardly from the pivot point 48 and is formed so as to be in the same plane as the opening 54 as well as the pivot point 48 and upper portion 46 of the linkage bracket 28. A stub 60 is formed in the lower end 62 of the tongue 58 and allows the driven linkage 30 to be affixed to the linkage bracket 28 by means of the stub 60 passing through a hole 64 at the end of the driven linkage 30 and affixed together by a cotter pin 65.

The linkage bracket 28 also comprises a lower portion 66 extending downwardly from the upper portion 56 and in which is formed a slot 68 of a particular configuration. The lower portion 66 and the slot 68 formed therein are in a plane that is displaced forwardly with respect to the plane of the pivot point 48 and tongue 58 as there is a forwardly extending transition portion 70 intermediate the upper portion 56 and the lower portion 66 of linkage bracket 28. In particular, the slot 68 comprises a wide, upper portion 72, a narrower intermediate portion 72 and a lower tapered portion 76 having a downwardly, inwardly tapered surface 78 in the general configuration of an arrow. At the upper point where the lower, tapered portion 66 intersects with the intermediate portion 72, there is formed an abrupt shoulder forming a guide stop 79.

A guide 80 is fitted for movement within the lower portion 76 of the slot 68 and the guide comprises a roller 82 having an external groove 84 formed in outer peripheral surface of the roller 82 so that the groove 84 rides along the inwardly tapered surface 78 of the lower portion 76 of slot 68. Roller 82 further includes an outwardly extending shaft 86 that passes through a hole 88 formed in the end of the drive linkage 34 and can be secured thereto by a cotter pin 90. Thus, guide 80 is secured to the drive linkage 34 and guide 80, as well. Therefore, the drive linkage 34 can be moved by the rotational movement of the linkage bracket 28.

The electrical switch 50 includes a pair of spring brackets 92 that extend outwardly from both sides of the electrical switch 50 and each of the spring brackets 92 has an elongated indentation 94 (only one of which is shown) that interfit with the inner edges of the upper portion 72 of the slot 68 such that the spring brackets 92 secure the electrical switch 50 to the lower portion 66 of the linkage bracket 28. A switch button 96 extends downwardly from the electrical switch 50 and is axially movable in order to operate the electrical switch 50 i.e. by making and breaking a circuit. The switch button 96 interfits within groove 84 in roller 82.

A slide actuator 100 is positioned intermediate the electrical switch 50 and the guide 80 and operates to move the switch button 96 in its axial direction to operate the electrical switch 50. A spring (not shown) is interfit between the slide actuator 100 and electrical switch 50. As can be seen, the slide actuator 100 also includes a pair of elongated slots 102 formed in each side thereof. The elongated slots 102 interfit with the internal edges of the intermediate portion 74 of the slot 68 so that the slide actuator 100 may freely slide along the internal edges of the slot 68 and move axially to contact and cause the switch button 96 to also move axially and thus operate the electrical switch 50. In order to align and interfit with the switch button 96, there is an extended housing 104 molded into the slide actuator 100 to receive and contain the switch button 96 and thus provide protection to the switch button 96 from inadvertent damage.

Figure 4:
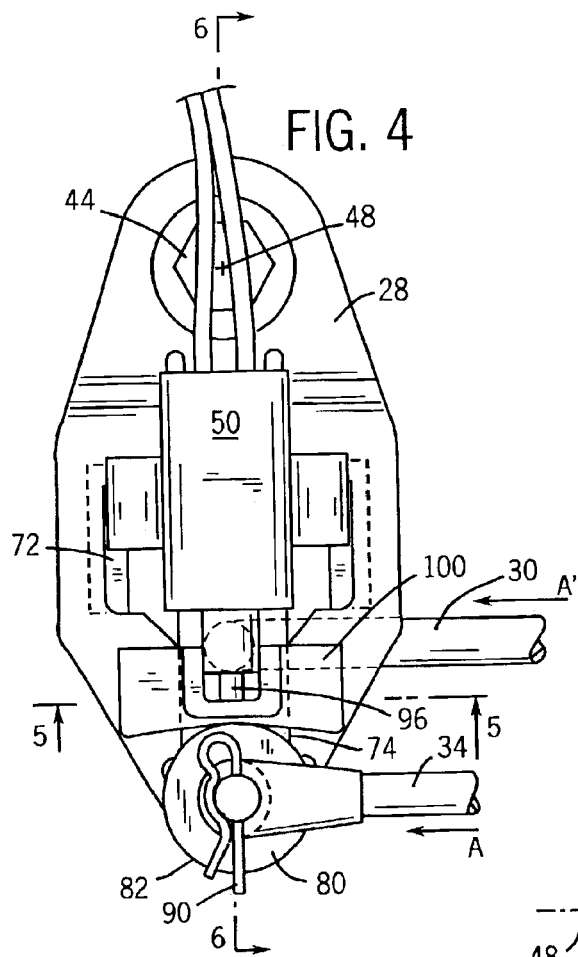
FIG. 4 is a side plan view of a portion of FIG. 2.

Referring to FIG. 4, there is shown a view of the components of the shift linkage 24 of the present invention in an assembled condition. As shown, the linkage bracket 28 is pivotally mounted to a fixed surface which may be the internal combustion engine itself (not shown in FIG. 4) by means of bolt 44 to constitute a pivot point 48 for the linkage bracket 28. The driven linkage 30 is also affixed to the linkage bracket 28 as is the drive linkage 34, the latter being connected to the linkage bracket 28 at a further distance or moment arm from that pivot point 48. As the drive linkage 34 is moved in the direction of the arrow A, the linkage bracket 28 rotates clockwise about pivot point 48 and moves the driven linkage 30 in the direction of arrow A.

In the initial movement of the drive linkage 34 in the direction of arrow A, however, the guide 80 moves along the internal edge of the inwardly tapered surface 78 of the lower portion 76 of slot 68 and thus the guide 80 moves in a generally vertically upward direction and not immediately in the direction of arrow A. Thus, as the movement of the drive linkage 34 progresses, the initial movement causes the guide 80 to move in a generally vertical upward direction to cause the slide actuator to also move upwardly to depress the switch button 96 and thus activate the electrical switch 50. Continued movement of the drive linkage 34 thus causes the guide 80 to reach a high corner or guide stop 79 at the upper corner of the tapered surface 78 where the guide 80 cannot continue further in the upward direction and the movement of the drive linkage 34 thereafter causes full movement of the driven linkage 30 in the direction of arrow A, thus, there is a lost motion between the drive linkage 34 and the driven linkage 30.

Figure 5:
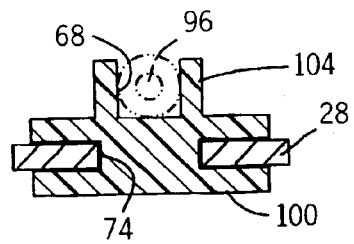
FIG. 5 is a cross-sectional view taken generally along line 5—5 of FIG. 4.

Turning briefly to FIG. 5, there is shown a cross-sectional view taken along the line 5—5 of FIG. 4 showing the switch button 96 captured within the extended housing 104 of the slide actuator 100 and the intermitting of the slide actuator 100 within the inner edge of the intermediate portion 74 of the slot 68.

Figure 6:
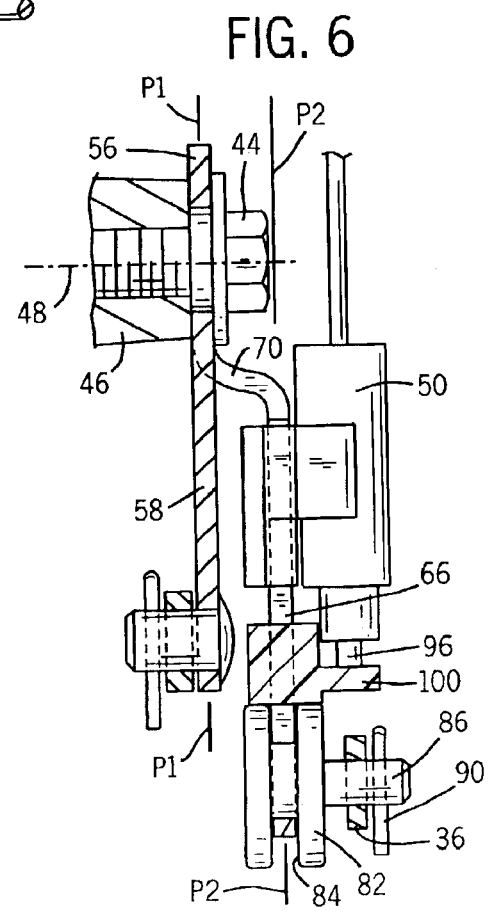
FIG. 6 is a cross-section side view taken generally along line 6—6 of FIG. 4 showing a switch in an open position.

Referring now to FIG. 6, there is shown a side cross sectional view taken along the line 6—6 of FIG. 4 and showing, more clearly, the plane P1 of the upper portion 56 of the linkage bracket 28 and the plane P2 of the lower portion 66. The displacement of planes P1 and P2 with respect to each other caused by the transition portion 70 of the linkage bracket 28 that is between the upper portion 56 and the lower portion 66 is also illustrated. Thus, tongue 58 and the pivot point 48 are in the same plane P1 and the portion 66 of the linkage bracket 28 are in another plane P2.

Figure 7:
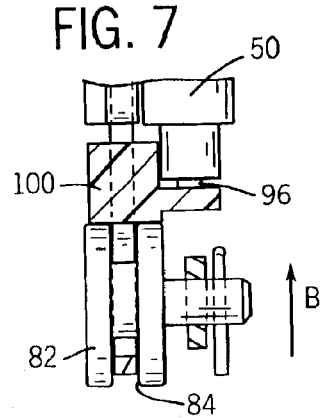
FIG. 7 is a fragmentary sectional view of a portion of FIG. 6 showing the switch in a closed position.

As also can be seen in FIG. 6, the switch button 96 is in its non-depressed or extended position since guide 80 is at the bottom of the generally V-shaped or arrow-shaped lower portion 72 of slot 68. Referring briefly to FIG. 7, there is shown a fragmented view of a portion of that shown in FIG.

6 and showing switch button 96 in its depressed position or upper position wherein the electrical switch 50 is activated. Thus, in FIG. 7, the guide 80 has moved vertically upwardly as seen by arrow B as sliding along the arrow-shaped tapered surface 78 (FIG. 4) of slot 68 and thus the slide actuator 100 has also moved upwardly, as is normal during the initial movement of the drive linkage 34 in the direction of arrow A of FIG. 4.

Figure 8A:
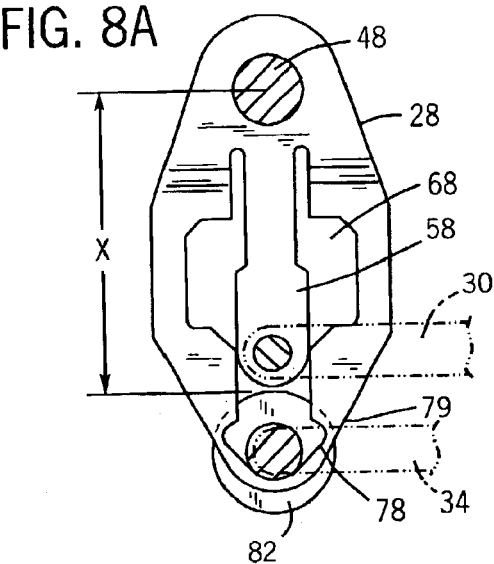
FIG. 8A is a side plan view of a linkage bracket with accordance with the present invention in a rest, neutral position showing a portion of the shift linkage in phantom.
Figure 8B:
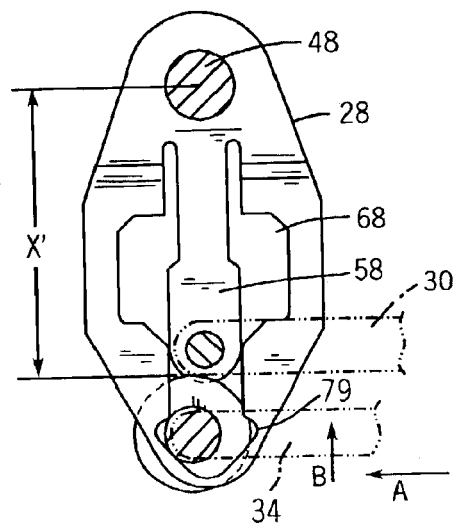
FIG. 8B is a side plan view, similar to FIG. 8A, but showing the linkage in motion during a first phase of shifting.
Figure 8C:
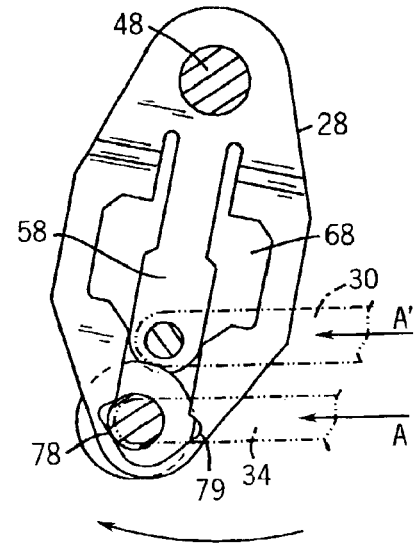
FIG. 8C is a side plan view, similar to FIGS. 8A and 8B, but showing the linkage motion during a second phase of shifting.

FIGS. 8A, 8B and 8C illustrate the operation of the linkage bracket 28 in three different phases. As can be seen, there is a finite linear distance X from the pivot point 48 to the tip of the guide 80 that varies as the roller 82 moves upwardly and downwardly along the inwardly tapered surface 78. Before the initial movement of the drive linkage 34, the roller 82 is in the lowest position within the lower portion 76 of the slot 68. As the drive linkage 34 moves in the direction of arrow A, FIG. 8B, roller 82 moves upwardly along tapered surface 78 along arrow B without displacing the driven linkage 30. It is important to recognize that the displacement ratio between the drive linkage 34 and the driven linkage 30 is one to one (1:1) after slack, or lost motion, is absorbed by the initial movement. Therefore, in the second phase of movement as shown in FIG. 8B, the roller 82 moves upward until it reaches its highest position on the tapered surface 78 at the guide stop 79 and closes the switch button 96 of the electrical switch 50 (not shown). In a third phase of movement, as shown in FIG. 8C, further displacement of the drive linkage 34 in the direction of arrow A causes the linkage bracket 28 to further rotate and in turn cause the driven linkage 30 to move in the direction of arrow A, as shown in FIG. 8C.

Referring again to FIGS. 8A and 8B, it can be seen that the length X is different in FIGS. 8A and 8B because the roller 82 is in a higher position in FIG. 8B in order to close the button of the switch and to compensate for the vertical length of the button in a close/open position, as best shown in FIGS. 6 and 7.

Referring to FIG. 9, the method steps of the present invention, together with the acts accomplished by the ECU are depicted in flow chart form. As is shown, the overall functioning commences at 108 with the normal operation of the engine at 110. That is, the engine at 110 is operating with all of the cylinders fully functioning and enabled in the usual use of the engine to propel the watercraft. Thus, at 112, the ECU determines whether there has been an attempt by the user to shift the position of the gears from forward or reverse into neutral. As explained, that information is determined and accordingly input to the ECU from the sensor that provides a signal when the lost motion mechanism has detected that the user is attempting to carry out a shifting procedure.

Accordingly, at 112, as long as there is no signal from the sensor 112a, the system will defer to the normal operation of the engine and continue that operation unchanged at 110. If, however, at 112, the ECU detects that there is a signal from the sensor 112b, therefore indicating that the user is attempting to shift gears, there will be a timer initiated at 114 or, if a timer is already running, an indication will be made of the time at that instant. The ECU thereupon checks to determine the rpm of the engine at 116 to compare that which is input, the actual rpm, with a predetermined rpm that is contained in a memory function of the ECU. In the preferred embodiment, the predetermined engine rpm may be about 1000 rpm. If the actual rpm exceeds the predetermined rpm 116a, the system will simply return the engine to its normal operation at 110 as the engine is rotating at too fast a speed to carry out the shifting operation. If, on the other hand, the rpm of the engine is below predetermined value 116, 116b, the system will continue to the next step at 118 where at least one cylinder is disabled. With a six cylinder engine, it is preferred that two of the cylinders be disabled.

Despite the at least one cylinder being disabled, engine speed is relatively maintained by increasing the torque placed on the crankshaft in the other, non-disabled cylinders. Torque is increased by increasing fuel quantity delivered to the non-disabled cylinders and advancing the ignition timing angle. As such, average torque delivered to the crankshaft remains relatively constant but the torque delivered by the enabled cylinders is increased to account for the loss of torque of the disabled cylinder(s). While average torque is maintained, instantaneous torque is not. A decreased torque, at the moment a disabled cylinder is at TDC, will assist in the shift. The system will operate with an increased variation in output torque for a predetermined number of revolutions, again predetermined by a value stored in the memory of the ECU and, preferably, about four revolutions. Thus, at 120, the ECU will determine if the desired shift has been completed. If yes, 120a the engine is returned to normal operation with the disabled cylinders restored and the fuel quantity and ignition angle restored. It is desirable to complete the shift during a time when one of the disabled cylinders is, in fact, disabled as the torque delivered by the piston on the crankshaft in the cylinder would be at a minimum. If the shift has not been completed 120b, the ECU will determine if a specified number of revolutions after disabling of the at least one cylinder has taken place 121. If not 121a, the program returns to step 120 to determine if the shifting has been completed. If the specified number of revolutions, preferably four, have taken place 121b, the ECU will, at 122, enable the disabled cylinder or cylinders and restore normal fuel quantity and ignition angle to restore the torque contribution on the crankshaft in each cylinder to normal. As is thus evident, there is very little reduced speed time or loss of engine power (as a result of an average torque on the crankshaft being maintained) such the user will not experience a drastic reduction of speed or power that could affect the maneuverability of the watercraft.

As the system of the present invention continues, the timer is checked to determine the elapsed time from the inception of the reduced speed by the disabling of at least one cylinder and the return to the full speed at 124. Again there is a predetermined maximum time allotted by the CPU of the ECU and, at 124, if that maximum time has elapsed 124a, the system will automatically return the engine to its normal operation at 110. If that maximum time has not yet elapsed 124b upon the return of the engine to its full running operation 122, the system will further check, at 126, if the gear shift has occurred. That is, the system will determine whether the gears have shifted from their position prior to the initiation of the cycle. If that gear change has taken place 126a, the engine is returned to its normal running operation at 110 and the present system has been completed. If, however, at that point, the gear shift has not yet completed and the gears have not been changed from the original positions 126b, the system again counts the number of revolutions to determine if a specified number of engine revolutions has taken place 128. Preferably, the system determines if four engine revolutions have occurred. If so 128a, the steps of the present inventive cycle will recommence and the system will again be looking for a signal from the sensor indicative of a continued attempt by the user to shift the gears at 112. If not 128b, the system returns to time out block 124 and carries out the functions associated therewith as discussed above.

Accordingly, the present invention includes a shift enabling interrupt system that includes a shift linkage communicating with a gear train of an engine and a sensor to detect motion of the shift linkage. An ECU having a computer readable storage medium and a computer program thereon causes the ECU to receive a signal from the sensor indicative of motion in the shift linkage, and then periodically disable at least one cylinder of the engine. The computer program then causes the ECU to periodically enable all of the cylinders of the engine.

In a preferred embodiment, the program causes the ECU to repeat the periodically enable and disable acts alternately until a shift is complete or another process disabling act occurs, such as the time out of a timer, or the engine exceeds a given rpm.

The invention also includes a system to enable a gear shift of an engine that includes an ECU having a microprocessor connected to a gear shift, wherein the gear shift includes a shift linkage and a shift sensor. A computer program is provided that when executed by the microprocessor, causes the microprocessor to periodically disable the at least one cylinder of the engine for a predetermined number of engine revolutions, enable all cylinders, and continue to repeat the periodically disablement and enablement acts during a shift attempt until a process disabling act occurs. For example, if the engine rpm exceeds a predetermined value, the act of periodically disabling at least one cylinder is disabled. Also, a timer is initiated by the microprocessor to regulate a maximum length of time to complete a shift.

The system is incorporated into a marine propulsion unit having a set of gears for forward and reverse operation coupled to the engine. A linkage bracket, a guide, a switch, a drive linkage, and a driven linkage are all provided in accordance with the aforementioned description to further enable a smooth shifting of gears in the outboard marine engine.

Accordingly, the invention includes a method to promote shifting of a gear shift of an outboard marine engine that includes determining an attempted shift of a gear shift of the outboard marine engine, ensuring revolutions per minute of the engine is under a given value, and disabling at least one cylinder of the engine for at least one revolution. The method next includes enabling each cylinder of the engine upon completion of the at least one revolution, and then periodically repeating the aforementioned steps until a process disabling step occurs. The process disabling step can include completing a shift, exceeding a given rpm, or exceeding a predetermined time for shifting. Preferably, in a six cylinder engine, two of the cylinders are disabled for four engine revolutions before being re-enabled for four revolutions.

In accordance with another aspect of the invention, a system for enabling shifting of a gear shift of an engine includes a means for detecting an attempted shifting of gears of an engine, which can include the aforementioned linkage bracket and switch arrangement, but is understood that the present invention is not so limited. For example, any linkage arrangement can be used to initiate an electrical signal to the ECU that a shift attempt is in progress. The system also includes a means for monitoring revolutions per minute of the engine. Such a means can include a magnetic pick-up in association with the rotation of a flywheel of the engine, or any other tachometer type means. The system next includes a means for periodically re-enabling each cylinder of the engine. Such means can include an ECU with a microprocessor and a computer program, or can equivalently include a discrete circuit to perform the same functions. The system also includes a means for repeating each of the aforementioned functions until a disabling function occurs. Such repeating means can include the aforementioned microprocessor and software, or can be built into a discrete circuit.

The present invention has been described in terms of the preferred embodiment, and it is recognized that equivalents, alternatives, and modifications, aside from those expressly stated, are possible and within the scope of the appending claims.

What is claimed is:

1. A system to enable a gear shift of an engine, comprising:

an engine having a microprocessor connectable to a gear shift, wherein the gear shift includes a shift linkage and a shift sensor;

a computer program that when executed by the microprocessor causes the microprocessor to periodically disable at least one cylinder of the engine for a predetermined number of engine revolutions, enable all cylinders, and continue to repeat the periodically disablement and enablement acts during a shift attempt.

2. The system of claim 1 further comprising a disabling loop wherein the computer program causes the microprocessor to:

receive data indicative of a shift attempt of the gear shift from the shift sensor;

determine RPM of the engine;

disable the act of periodically disabling at least one cylinder of the engine if the RPM exceeds a predetermined value.

3. The system of claim 2 wherein the computer program further causes the microprocessor to initiate a timer to regulate a maximum length of time to complete shifting of the gear shift.

4. The system of claim 1 wherein the shift sensor is configured to detect linear motion of the shift linkage and the shift linkage is configured to change operating gears of the engine.

5. The system of claim 1 further comprising:

a marine propulsion unit having a set of gears for forward and reverse operation coupled to the engine;

a linkage bracket having an upper portion and a lower portion offset from the upper portion, the upper portion having a pivot point therein and a tongue extending downwardly therefrom in a common plane with the pivot point and the upper portion, the lower portion having a slot parallel to the tongue and leading to a lost-motion channel in a lower end of the slot wherein an upper end of the lost-motion channel is wider than the slot leading to the lost-motion channel thereby forming a pair of guide stops in the offset lower portion of the linkage bracket;

a guide disposed in the lost-motion channel and configured to ride along either side of the lost-motion channel until the guide contacts one of the pair of guide stops;

a switch positioned about the slot of the linkage bracket and connected to an ECU of the outboard motor which controls operation of the engine;

a drive linkage coupled to a shifting mechanism at one end and to the linkage bracket to drive the linkage bracket to pivot about a pivot axis; and a driven linkage coupled to the marine propulsion unit at one end and to the linkage bracket at another end, wherein the initial movement of the drive linkage is translated to substantially vertical motion of the guide in the linkage bracket to activate the switch and further movement of the drive linkage is then translated to the driven linkage.

6. A method to promote shifting of a gear shift of an outboard marine engine, the method comprising the steps of:

(A) determining en attempted shift of a gear shift of an outboard marine engine;

(B) setting a timer to regulate a time to promote shifting;

(C) ensuring revolutions per minute of the engine is under a given value;

(D) disabling at least one cylinder of the engine for at least one revolution;

(E) enabling each cylinder of the outboard marine engine upon completion of the at least one revolution; and (F) periodically repeating steps (A)–(D) until a process disabling step occurs.

7. The method of claim 6 wherein the process disabling step includes at least one of:

completing a shift;

exceeding an RPM of the given speed; and exceeding a predetermined time for shifting.

8. The method of claim 6 wherein the disabling step disables two cylinders of a six cylinder engine for four engine revolutions at a time.

9. The method of claim 6 further comprising the step of sensing a shift linkage movement by detecting linear motion of the shift linkage.

10. The method of claim 6 further comprising the step of permitting shifting of the gear shift if the RPM of the engine is less then 1000.

11. A system for enabling shifting of a gear shift of an engine comprising:

means for detecting an attempted shifting of gears of an engine;

means for monitoring revolutions per minute of the engine;

means for periodically disabling a number of cylinders of the engine;

means for periodically re-enabling each cylinder of the engine;

means for repeating each aforementioned function until a disabling function occurs; and means for maintaining an average torque delivered on a crankshaft of the engine during the periodic disabling of the number of cylinders.

12. The system of claim 11 further comprising means for increasing the torque delivered to the crankshaft in a non-disabled cylinder during the periodic disabling of the number of cylinders.

13. A shift enabling interrupt system comprising:

a shift linkage communicating with a gear train of an engine;

a sensor to detect motion of the shift linkage;

an ECU having a computer readable storage medium having thereon a computer program that when executed causes the ECU to:

receive a signal from the sensor indicative of motion in the shift linkage;

periodically disable at least one cylinder of the engine for four revolutions of the engine at a time; and periodically enable all cylinders of the engine.

* * * * *